(12) United States Patent
O'Sullivan

(10) Patent No.: US 9,147,911 B2
(45) Date of Patent: Sep. 29, 2015

(54) METHOD OF EXTENDING THE SHELF-LIFE OF A COIN CELL IN AN APPLICATION REQUIRING HIGH PULSE CURRENT

(75) Inventor: Paul B. O'Sullivan, Westford, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 542 days.

(21) Appl. No.: 13/377,914

(22) PCT Filed: Apr. 8, 2011

(86) PCT No.: PCT/US2011/031731
§ 371 (c)(1),
(2), (4) Date: Dec. 13, 2011

(87) PCT Pub. No.: WO2011/127376
PCT Pub. Date: Oct. 13, 2011

(65) Prior Publication Data
US 2012/0256595 A1 Oct. 11, 2012

(51) Int. Cl.
*H02J 7/00* (2006.01)
*H02J 7/04* (2006.01)
*H01M 10/44* (2006.01)

(52) U.S. Cl.
CPC .............. *H01M 10/44* (2013.01); *H02J 7/0065* (2013.01)

(58) Field of Classification Search
CPC ........ H02J 7/0065; H02J 7/022; H01M 10/44

USPC .......................................................... 320/135
See application file for complete search history.

(56) References Cited

U.S. PATENT DOCUMENTS

| | | | | |
|---|---|---|---|---|
| 4,967,895 | A * | 11/1990 | Speas | 194/200 |
| 6,118,248 | A * | 9/2000 | Gartstein et al. | 320/107 |
| 6,198,250 | B1 * | 3/2001 | Gartstein et al. | 320/112 |
| 6,967,415 | B2 | 11/2005 | Takehara | |
| 7,081,816 | B2 * | 7/2006 | Schebel et al. | 340/545.6 |
| 7,550,943 | B2 * | 6/2009 | Spartano et al. | 320/107 |
| 7,554,312 | B2 | 6/2009 | Fulton et al. | |
| 8,062,783 | B2 * | 11/2011 | Carter et al. | 429/122 |
| 8,115,454 | B2 * | 2/2012 | Cintra et al. | 320/140 |
| 2002/0000797 | A1 * | 1/2002 | Schultz et al. | 323/282 |
| 2005/0040800 | A1 * | 2/2005 | Sutardja | 323/283 |
| 2005/0093526 | A1 * | 5/2005 | Notman | 323/282 |
| 2005/0110469 | A1 * | 5/2005 | Inaba et al. | 323/222 |
| 2007/0114968 | A1 * | 5/2007 | Krah et al. | 320/103 |
| 2007/0212596 | A1 * | 9/2007 | Nebrigic et al. | 429/61 |
| 2008/0160937 | A1 | 7/2008 | Baker et al. | |
| 2008/0315829 | A1 | 12/2008 | Jones et al. | |
| 2009/0309552 | A1 * | 12/2009 | Krah et al. | 320/140 |
| 2013/0313996 | A1 * | 11/2013 | Williams | 315/291 |

* cited by examiner

*Primary Examiner* — M'Baye Diao
(74) *Attorney, Agent, or Firm* — Maine Gernota & Radin; Andrew P. Carnota; Daniel J. Long

(57) ABSTRACT

A system is provided for extending the shelf life capacity of a coin cell, the system utilizing a coin cell; a voltage step up converter/regulator, configured to step up the voltage of output from the coin cell and the storage capacitor; and a storage capacitor receiving output from the voltage step up converter/regulator.

8 Claims, 4 Drawing Sheets

METHOD OF EXTENDING THE SHELF-LIFE OF A COIN CELL IN AN APPLICATION REQUIRING HIGH PULSE CURRENT

STATEMENT OF GOVERNMENT INTEREST

The invention was made with United States Government support under Contract No. W31P4Q-06-C-0330 awarded by the Navy. The United States Government has certain rights in this invention.

RELATED APPLICATIONS

This application claims the benefit of U.S. Provisional Application No. 61/322,013, filed Apr. 8, 2010. This application is herein incorporated by reference in its entirety for all purposes.

FIELD OF THE INVENTION

The invention relates to a method of extending the shelf-life of a coin cell in an application requiring high pulse current.

BACKGROUND OF THE INVENTION

A coin cell provides an attractive, low-cost and volume-efficient energy source solution for a firing circuit for a miniature electro-explosive device (EED). In this application, the ability to fire the EED reliably after a long shelf-life period measured in years, with a high degree of reliability, is desired. At the end of this shelf-life period, the coin cell is required to charge a capacitor quickly, resulting in a high pulse current load on the coin cell. A coin cell chemistry such as lithium poly carbon monofluoride [Li(CF)n] is well-suited in many respects for this application since it has a long shelf-life with a very low internal self-discharge rate. However, in applications such as this, the coin cell also powers the control circuitry which generally requires that the voltage remain above a threshold voltage for proper operation during this pulse loading of the coin cell. The coin cell output voltage is a function of the pulse current load and the internal impedance of the coin cell. Not much information exists in published literature on the effect of shelf life on the internal impedance of these coin cells, but testing after exposure to high temperature diurnal cycling (−38 C. to 70 C.) for a period of 30 days showed some degradation in the internal impedance.

Because of volume constraints, simply using a larger coin cell with a higher discharge rate capability (and thus a lower internal impedance) is not a feasible solution in this application. In addition, it is desired that the solution should be low-cost.

What is needed, therefore, are techniques to accommodate this degradation and extend the shelf-life capability of the coin cell.

SUMMARY OF THE INVENTION

One embodiment of the present invention provides a system for extending the shelf life capacity of a coin cell, the system comprising: a coin cell; a voltage step up converter/regulator, configured to step up the voltage of output from the coin cell; a storage capacitor receiving output from the voltage step up converter; and a firing circuit disposed on the storage capacitor.

Another embodiment of the present invention provides such a system further comprising a resistor disposed between the voltage step up converter and the storage capacitor.

A further embodiment of the present invention provides such a system wherein the converter/regulator is a boost regulator.

Still another embodiment of the present invention provides such a system wherein the converter/regulator is a regulator with output voltage that is higher than input voltage and high efficiency at low power levels.

One embodiment of the present invention provides a method for extension of a shelf life of a coin cell powered firing circuit; operating a coin cell at a low voltage; using a converter to boost voltage from the coin cell; and boosting and regulating the voltage above a threshold voltage of the firing circuit.

Another embodiment of the present invention provides such a method further comprising storing the voltage in a storage capacitor.

A further embodiment of the present invention provides such a the method further comprising filtering the voltage with a storage capacitor resistor.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

In one embodiment of the present invention a system 10 is provided for extending the shelf life capacity of a coin cell, the system having: a coin cell 12, a voltage step up converter/regulator 14, configured to step up the voltage output from the coin cell 12, and a storage capacitor 16 and a firing circuit (not shown, path to circuit is identified with ref No. 18) disposed on the output side of the voltage step up regulator.

Figure 1:
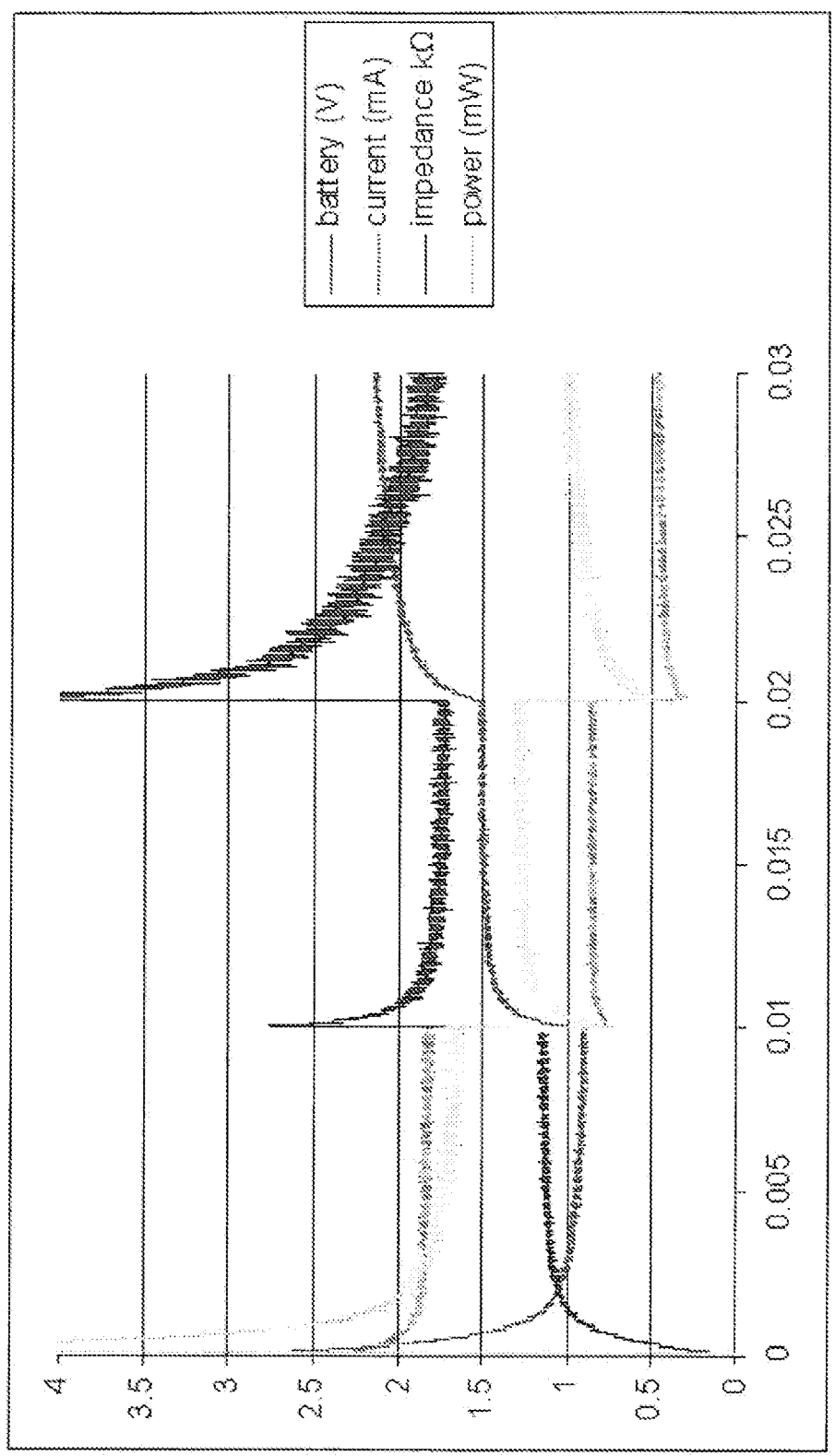
FIG. 1 is a graph of performance of a known coin cell without a converter.

Testing of coin cells show that the coin cell internal impedance decreases with increasing current loads within limits. As illustrated in FIG. 1, a graph of coin cell power output in the absence of a converter/regulator, increased power is available when the output is loaded to a point where the cell output voltage is substantially below 50% of its open circuit voltage (50% of the open circuit voltage being the point where a cell with a constant source impedance would deliver maximum power to the load). The coin cell can provide increased power output at higher current loads, albeit at a reduced output voltage.

Figure 2:
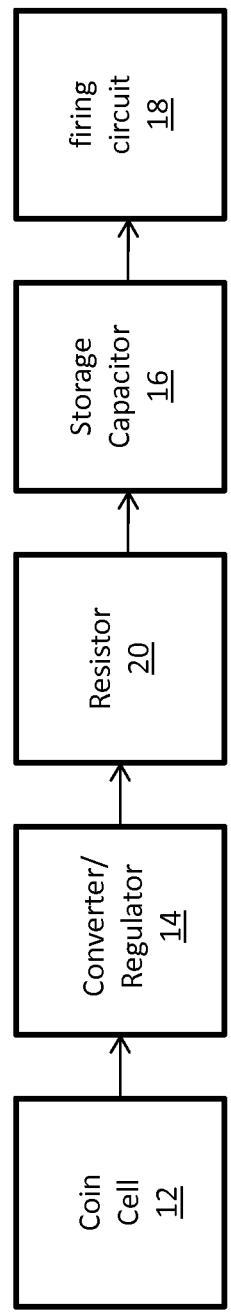
FIG. 2 is a block diagram illustrating a converter regulator configured in accordance with one embodiment of the present invention.
Figure 3:
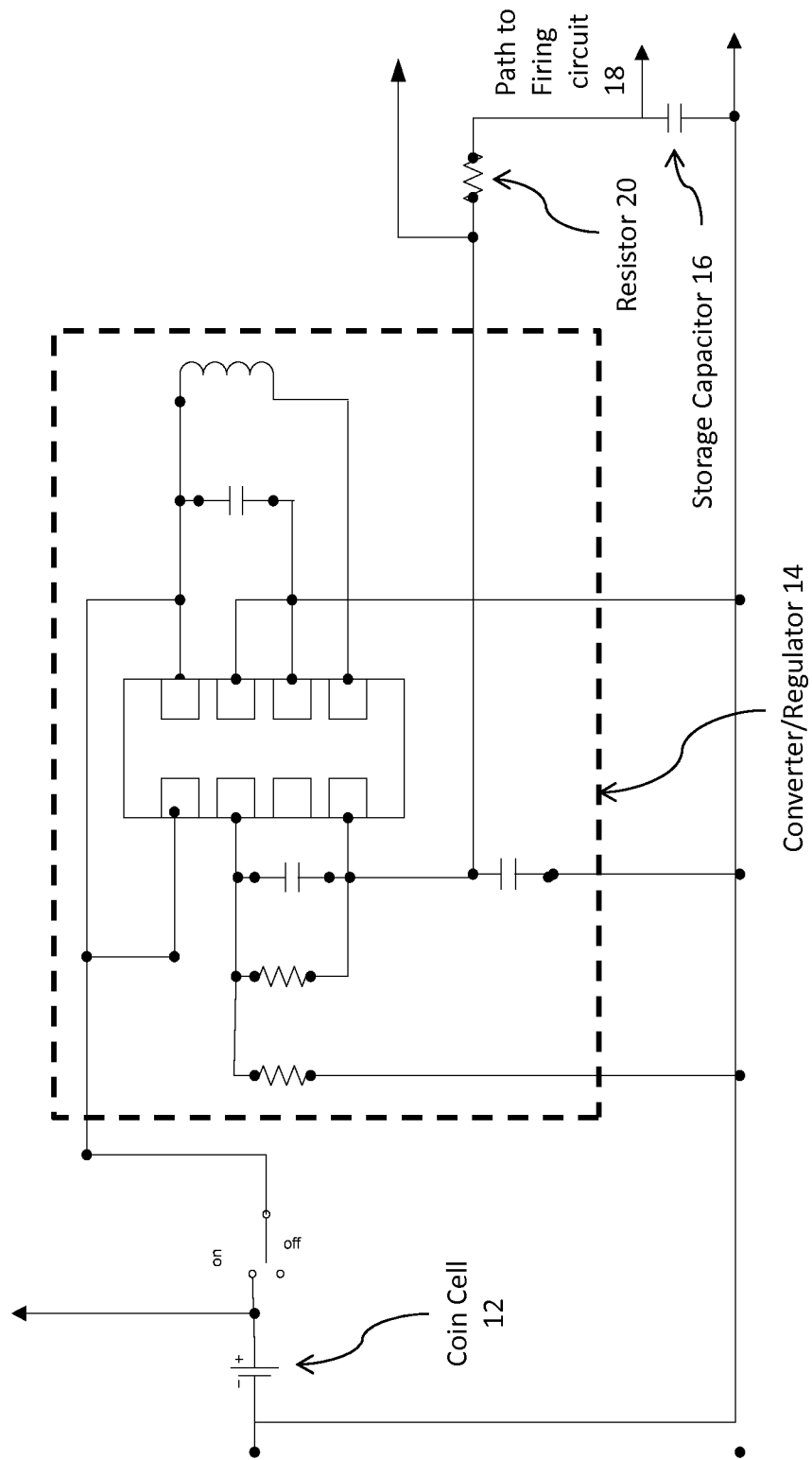
FIG. 3 is a circuit diagram illustrating a converter implementation configured in accordance with one embodiment of the present invention.
Figure 4:
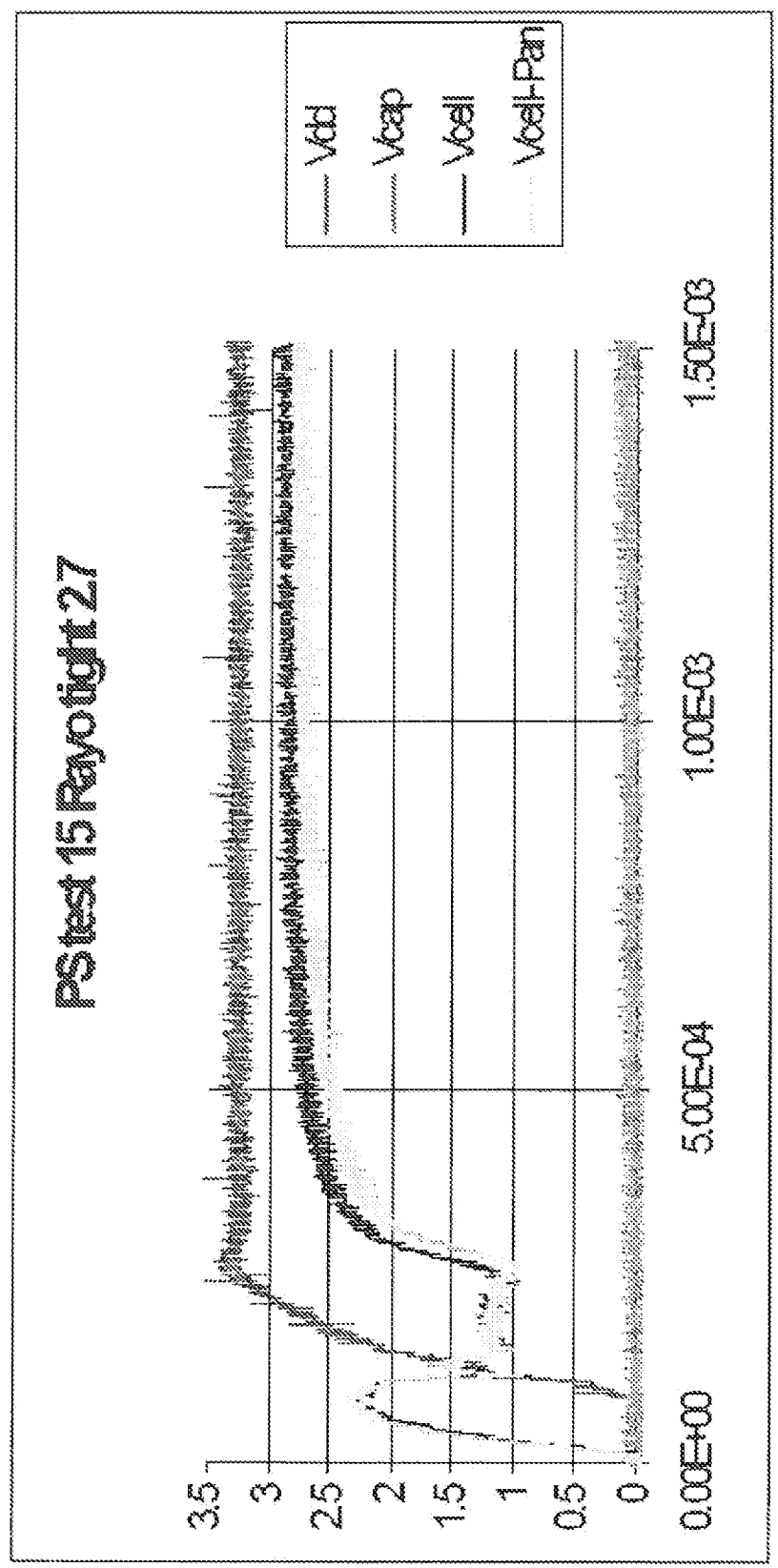
FIG. 4 is a graph of performance of a known coin cell with a converter configured according to one embodiment of the present invention.

One embodiment of the present invention takes advantage of this fact by adding a converter/regulator 14 between the output of the coin cell 12, and the firing-control circuit 18 and with a storage capacitor charging resistor 20, and is shown in block diagram form in FIG. 2. In one embodiment, the converter/regulator 14 is a boost regulator. The boost regulator of such an embodiment is selected as it can develop an output voltage that is higher than the input voltage with high efficiency at low power levels, and it is small and inexpensive. The converter/regulator 14 provides a constant voltage to the storage capacitor charging resistor 20 and the firing control circuit 18 (above the required threshold), while operating the coin cell 12 at a low enough voltage to provide the required output power. By making use of a converter 14 with a low starting voltage and high efficiency, this circuit 10 allows for proper operation at lower voltage output at the coin cell. In such an embodiment, the circuit 10 can tolerate a greater degradation in the internal impedance of the coin cell, thereby extending the shelf life of the coin cell. The implementation of one embodiment of the present invention illustrated in FIG. 3 was tested with Panasonic and Rayovac BR1632 coin cells; sample test results with Rayovac BR 1632 cell are shown in FIG. 4. One skilled in the art will appreciate that alternative coin cells could be used.

One embodiment of the present invention provides a system for extending the shelf life capacity of a coin cell, the system comprising: a coin cell 12; a voltage step up converter/regulator 14, configured to step up the voltage of output from the coin cell 12; the storage capacitor 16 receiving output from the voltage step up converter 14; and a firing circuit 18 disposed on the output side of the voltage step up regulator 14. In such an embodiment, a resistor 20 can be disposed between the voltage step up converter 14 and the storage capacitor 16. In one such embodiment, the converter/regulator 14 is a boost regulator. In others it may be a regulator with output voltage that is higher than input voltage and high efficiency at low power levels.

One embodiment of the present invention provides a method for extension of a shelf life of a coin cell powered firing circuit; operating a coin cell at a low voltage; using a converter to boost voltage from the coin cell; and boosting and regulating the voltage above a threshold voltage of the firing circuit. Such a method may further comprise storing the voltage in a storage capacitor or filtering the voltage with a storage capacitor resistor.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for extending the shelf life of a coin cell powered firing circuit, the system comprising:
   a coin cell having an impedance which decreases with increasing current loads;
   a voltage step up converter/regulator, configured to step up the voltage of output from said coin cell;
   a storage capacitor receiving output from said voltage step up converter/regulator; and
   a firing circuit disposed on the output side of said storage capacitor and into which said storage capacitor discharges.

2. The system according to claim 1 further comprising a resistor disposed between said voltage step up converter/regulator and said storage capacitor.

3. The system according to claim 1 wherein said voltage step up converter/regulator is a boost regulator.

4. The system according to claim 1 wherein said voltage step up converter/regulator is a regulator with output voltage that is higher than input voltage and high efficiency at low power levels.

5. The system of claim 1 wherein said voltage step up converter/regulator is, during operation, configured to extract power from said coin cell at a rate substantially below 50% of its open circuit voltage.

6. A method for extension of a shelf life of a coin cell powered firing circuit;
   operating a coin cell at a low voltage, said low voltage being substantially below 50% of its open circuit voltage;
   using a converter to boost voltage from said coin cell; and
   boosting and regulating said voltage above a threshold voltage of said firing circuit.

7. The method of claim 6 further comprising storing said voltage in a storage capacitor.

8. The method of claim 6, said method further comprising filtering said voltage with a storage capacitor resistor.

* * * * *